(12) United States Patent
Luetche et al.

(10) Patent No.: US 7,027,166 B2
(45) Date of Patent: Apr. 11, 2006

(54) METHOD FOR MEASUREMENT OF THE DISTANCE BETWEEN A COMPONENT WHICH IS MOVED PAST A REFERENCE SURFACE AND THAT REFERENCE SURFACE, AND A MEASUREMENT SYSTEM FOR CARRYING OUT THE METHOD

(75) Inventors: Jochen Luetche, Potsdam (DE); Uwe Pfeifer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 414 days.

(21) Appl. No.: 10/453,657

(22) Filed: Jun. 4, 2003

(65) Prior Publication Data

US 2004/0114154 A1 Jun. 17, 2004

(30) Foreign Application Priority Data

Dec. 12, 2002 (EP) .................................. 02027867

(51) Int. Cl.
*G01B 11/14* (2006.01)

(52) U.S. Cl. ........................ 356/615; 356/621; 356/623
(58) Field of Classification Search .................. 356/615
See application file for complete search history.

(56) References Cited

U.S. PATENT DOCUMENTS 3,591,290 A * 7/1971 Zinner et al. ................ 356/335
6,760,102 B1 * 7/2004 Harmstorf ................ 356/238.1

* cited by examiner

*Primary Examiner*—Gregory J. Toatley, Jr.
*Assistant Examiner*—Roy M. Punnoose
(74) *Attorney, Agent, or Firm*—Harness, Dickey & Pierce, P.L.C.

(57) ABSTRACT

A method for measurement of the distance between a component which is moved past a reference surface and that reference surface is intended to be suitable in particular for use for the measurement of radial gaps in a turbine, while having particularly high measurement accuracy. To this end, a method based on a triangulation measurement be combined with a reference measurement for determination of the actual speed of the component. In this case, two light beams aligned essentially parallel to one another as well as at least one further light beam, aligned at an angle to the parallel light beams in the movement direction of the component, are monitored for a respectively associated reflection signal which is caused by the component. The time difference between the arrival of the reflection signals associated with the parallel light beams on the one hand, and the time difference between the arrival of the reflection signals associated with one of the parallel light beams and the angled light beam on the other hand, are used to determine a characteristic value for the distance.

28 Claims, 2 Drawing Sheets

METHOD FOR MEASUREMENT OF THE DISTANCE BETWEEN A COMPONENT WHICH IS MOVED PAST A REFERENCE SURFACE AND THAT REFERENCE SURFACE, AND A MEASUREMENT SYSTEM FOR CARRYING OUT THE METHOD

The present application hereby claims priority under 35 U.S.C. §119 on European patent application number EP 02027867.7 filed Dec. 12, 2002, the entire contents of which are hereby incorporated herein by reference.

FIELD OF THE INVENTION

The invention generally relates to a method for measurement of the distance between a component which is moved past a reference surface and that reference surface. In particular, it relates to a method for measurement of the radial gaps for rotating turbine blades. It also generally relates to a measurement system for carrying out the method. In particular, it relates to a system for use for measuring the radial gaps in a turbine.

BACKGROUND OF THE INVENTION

Turbines are used in many fields for driving generators or process machines. In this case, the energy content of a flow medium, for example a combustion gas produced by combustion of a fuel, is used to produce a rotary movement of a turbine shaft. In this case, a number of rotor blades, which are normally combined into blade groups or blade rows, are arranged on the turbine shaft in order to produce the rotary movement of the turbine shaft, and drive the turbine shaft by way of an impulse transfer from the flow medium. Furthermore, stator blade rows which are connected to the turbine housing are normally arranged between adjacent rotor blade rows in order to guide the flow medium in the turbine unit.

In addition to a large number of other operating parameters, reliable monitoring of what is referred to as the radial gap is important for operation of such a turbine. The expression radial gap in this case refers to the distance between the free end of each rotor blade and the inner housing, which surrounds it, of the turbine. On the one hand, there is a design aim in order to achieve particularly high turbine efficiency for the radial gap to be kept as small as possible so that the flow medium which is guided in the turbine passes through the rotor blades rows with energy being converted and does not flow past the rotor blades through the radial gap, without any energy being transferred. On the other hand, however, it is absolutely essential to preclude any direct contact between the rotor blade end and the inner housing of the gas turbine, for operational safety reasons, in all cases. In this case, it should be remembered in particular that a thermal increase in the length of the rotor blades can occur during use in gas turbines owing to the comparatively high operating temperatures of up to 1200° C. which may possibly occur there, since this leads to the radial gap becoming smaller than when at rest. The radial gap in turbines is thus normally measured and checked regularly, or at least on a sampling basis.

It is therefore desirable to provide concepts for measurement and monitoring of the radial gap in a turbine. These concepts should be designed such that no contact is made in order to avoid adversely affecting the friction-free movement of the turbine. What is referred to as a triangulation measurement may be used as a noncontacting concept for this purpose, in which the radial gap, or in general the distance between a component which is moved past a reference surface and that reference surface, is detected by an optical device. In the case of a triangulation measurement such as this, two light beams are transmitted from the reference surface at an angle to one another such that, in the projection of the plane which is defined by the movement direction of the component and the normal to the reference surface, they intersect at a distance that is more than the maximum expected distance to be measured behind the reference surface. The beam path of the light beams thus forms a triangle in the projection, with a section of the reference surface as the base, in which case the beam path may in particular be chosen such that this triangle is an equilateral triangle. The measurement is in this case carried out by monitoring each of the light beams to determine whether the component to be measured, for example its leading edge, is passing through the respective light beam. This may be measured, for example, in the form of a light barrier or via a reflection signal associated with the respective light beam.

This concept thus makes it possible, with two light beams, to determine the time at which the component interrupts or enters the beam path. If the geometry of the beam path is known and the movement speed of the component is known, the measured time difference between the component passing through the light beams allows a characteristic length to be determined which the component has travelled between the light beams, and this characteristic length can in this case be converted, on the basis of the beam paths, to a distance between the component and the reference surface.

However, reliable use of a concept such as this for measurement of radial gaps in turbines is normally dependent on a comparatively high level of calibration complexity and, furthermore, the achievable accuracy is only limited in this case. Furthermore, vibration that occurs during operation of the turbine may considerably adversely affect the measurement accuracy, so that the reliability of such systems is only limited.

SUMMARY OF THE INVENTION

An embodiment of the invention is therefore based on an object of specifying a method for measurement of the distance between a component which is moving past a reference surface and that reference surface. The method is particularly suitable for use for measurement of the radial gaps in turbines, and has particularly high accuracy. A further aim is to specify a system which is suitable for carrying out the method.

With regard to the method, an object may be achieved according to an embodiment of the invention wherein two light beams which are aligned essentially parallel to one another, as well as at least one further light beam which is aligned at an angle to the parallel light beams in the movement direction of the component, are monitored for a respectively associated reflection signal which is caused by the component. A time difference between the arrival of the reflection signals which are associated with the parallel light beams on the one hand and the time difference between the arrival of the reflection signals which are associated with one of the parallel light beams and the angled light beam or two angled light beams on the other hand, is used to determine a characteristic value for the distance.

An embodiment of the invention is in this case based on the idea that the method for determining distances should be matched to a particular extent to the boundary conditions which normally occur in a turbine. In particular, in this case, it should be possible to take account of the fact that the local speed of the turbine blades may vary as a consequence of vibration or other fluctuations during operation of the turbine. When using an optical measurement method which is based on the triangulation concept, it should therefore be assumed, for particularly high measurement accuracy, that the speed at which the turbine blades move relative to the turbine inner wall is not constant, that is to say that the speed at which the component is moving relative to the reference surface is not constant. In fact, the measurement method should be designed such that even fluctuations in the speed at which the component is moving do not cause any corruption of the measurement results. In order to allow this, the measurement concept based essentially on a triangulation measurement is supplemented by a reference measurement which determines the current actual speed of movement of the component with respect to the reference surface. The parallel light beams are used for this purpose and allow a conclusion to be drawn about the current actual relative speed of the component with respect to the reference surface, by measuring the times at which the component passes through the respectively associated beam path, irrespective of the distance between the component and the reference surface. The time differences are then evaluated on this basis, that is to say the time difference determined from the light beams that are at an angle to one another is converted to the distance travelled by the component.

In this concept, in which a triangulation measurement is thus supplemented by a reference measurement, so that the distance characteristic value is determined taking into account the actual speed at which the component is moving, it is possible to use three, four or, if required, even more light beams. When using three light beams, two of these light beams are aligned parallel to one another, so that the passage of the component through these light beams produces a time difference which is characteristic of the speed at which the component is currently moving, irrespective of the distance from the reference surface. The third light beam is in this case aligned at an angle to the parallel light beams, so that this light beam in conjunction with one of the two parallel light beams can be used in the form of a conventional triangulation measurement. When using four light beams, the reference measurement can be carried out using two light beams that are aligned parallel, in which case the two further light beams can be aligned at an angle to one another in the form of a conventional triangulation measurement.

In particular, the measurement method makes it possible to obtain correct characteristic values for the respective distance between the component and the reference surface, irrespective of any vibration which may possibly occur, or else fluctuations in the speed at which the component is currently moving. This is advantageously used in the evaluation process, with no need whatsoever to take account of the expected speed of movement of the component, by determining the characteristic value for the distance from the ratio of the time differences.

In order to allow reliable determination of the time differences to be evaluated, the measurement method is, in a further advantageous refinement, designed for reliable association of the reflection signals which are caused by the component with the individual light beams. For this purpose, it is advantageous for each of the light beams to use light at a different wavelength, so that each reflection signal can be uniquely associated with one of the light beams by evaluation of the reflection signals on a wavelength-selective basis.

With regard to the measurement system, an object may be achieved by a light source for producing at least two light beams which are aligned essentially parallel to one another, and at least one further light beam, which is aligned at an angle to the parallel light beams in the movement direction of the component. The system further includes a detector for detection of reflection signals which are associated with each of the light beams and are caused by the component. The detector has an associated evaluation unit for determination of a distance characteristic value from the time difference between the arrival of the reflection signals which are associated with the parallel light beams on the one hand, and from the time difference between the arrival of the reflection signals which are associated with one of the parallel light beams and the angled light beam or two angled light beams, on the other hand.

The measurement system is in this case expediently designed such that the evaluation unit determines the distance characteristic value from the ratio of the time differences. In order in addition to allow reliable association of the reflection signals with the light beams, the light source in an alternative or additional advantageous development has a number of light generators corresponding to the number of light beams. These light generators differ from one another in the wavelength of the light which is in each case produced by them.

In order to allow the measurement system to be used even in comparatively severe environmental conditions and at points where access is difficult, for example for monitoring the radial gaps in a turbine, the functional components such as light sources and detectors are advantageously physically decoupled from the actual point of use, that is to say in particular from the reference surface. In order to allow this, the light source is advantageously connected via an optical waveguide system to a light outlet and inlet which is arranged in the reference surface. In a further advantageous refinement, the detector is in this case likewise connected via the optical waveguide system to the light outlet and inlet.

In order to make it possible on the one hand to provide the two light beams which are aligned parallel to one another and on the other hand the light beams which are aligned at an angle to them in a particularly simple manner when using an optical waveguide system such as this, the optical waveguide system is, in a further advantageous refinement, provided in places with a lens arrangement, in particular with a convex lens, in the area of the light outlet and inlet.

The optical waveguide system advantageously has a number of optical fibers, which are arranged within a common casing, corresponding to the number of light beams.

The measurement system is advantageously used for monitoring the radial gap in a turbine.

The advantages which are achieved by an embodiment of the invention are in particular that the combination of a distance measurement based on the triangulation principle with a reference measurement allows a distance characteristic value for the component which is moving past the reference surface to be determined with high accuracy, even if the speed at which the component is moving is fluctuating or varying. The method and the measurement system which is provided for carrying out the method are thus particularly suitable for use for monitoring the radial gaps in a turbine.

Furthermore, owing to the optical measurement principle, the measurement system can be used with equally high accuracy at all temperatures that are relevant for use for the monitoring of the radial gap in a turbine, for example from 0° C. to 450° C. The use of the optical waveguide for optical coupling of the light source and detector to the reference surface allows the measurement system to be constructed in a particularly compact manner in the area of the reference surface, so that unrestricted use is possible even in comparatively complex mechanical systems, using standardized holes with an external diameter of, for example, a maximum of 7.2 mm. The consideration of the reference measurement also allows the measurement system to be used largely without any need for calibration even over a comparatively long operating life, in which case all that is necessary for reliable determination of measurement values is a calibration when the system is first brought into use, in order to determine the precise light beam geometry. As soon as the light beam geometry has been determined, there is no need for any more readjustment of the characteristic operating parameters for the measurement system.

BRIEF DESCRIPTION OF THE DRAWINGS

An exemplary embodiment of the invention will be explained in more detail with reference to a drawing, in which.

Identical parts are provided with the same reference symbols in all the figures.

DETAILED DESCRIPTION OF THE PREFERRED EMBODIMENTS

Figure 1:
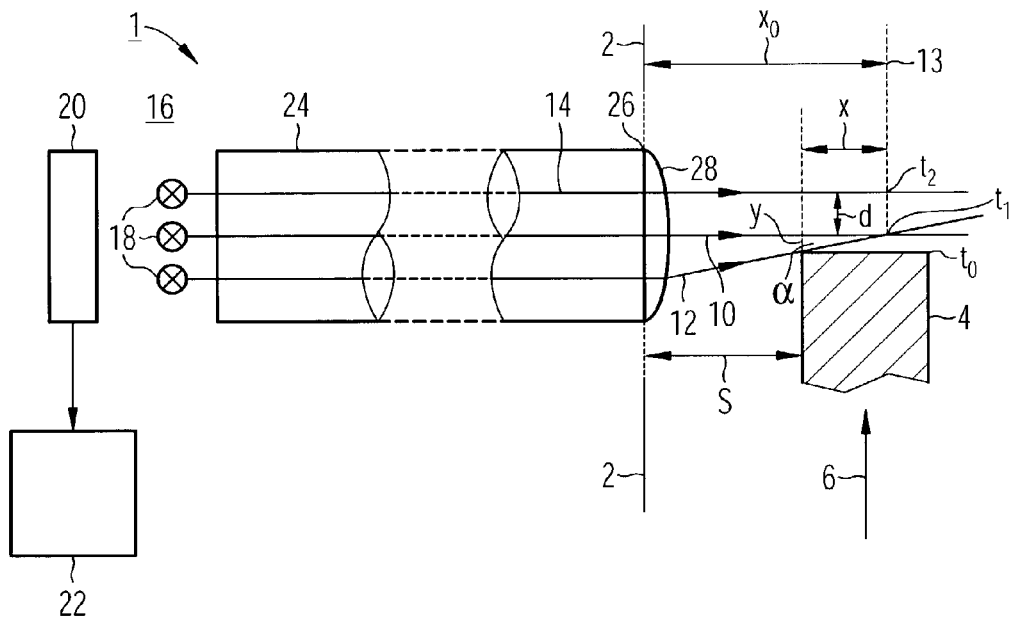
FIG. 1 shows, schematically, a measurement system for determination of the distance between a component which is moved past a reference surface and that reference surface

The measurement system 1 shown in FIG. 1 is intended for determining the distance s between a component 4, which is moved past a reference surface 2, and that reference surface 2. The component 4, whose movement direction is aligned essentially parallel to the plane in which the reference surface 2 extends and is indicated by the arrow 6, is in this case in particular a rotor blade in a turbine that is not shown in any more detail. The reference surface 2 is, for example, internal cladding in the turbine. In this case, the measurement system 1 is thus used for monitoring the radial gaps in the turbine, with the distance s being equal to the radial gap in the turbine.

In principle, the measurement system 1 is based on the use of what is referred to as the triangulation principle. In this case, in the exemplary embodiment shown in FIG. 1, a first light beam 10 and a second light beam 12 are used, with the second light beam 12 being aligned at an angle to the first light beam 10, seen in the movement direction of the component 4. In the projection shown in FIG. 1, the light beams 10, 12 thus intersect in the focal plane 13. The distance $x_0$ between the focal plane 13 and the reference surface 2 in this case governs the maximum possible measurement range, within which the distance s can be determined.

In order to determine the distance s, the light beams 10, 12 are monitored for the occurrence of a reflection signal which is caused by the component 4. Specifically, as soon as the component 4 enters the beam path of the light beam 10 or 12 as a result of its movement, the respective light beam 10 or 12 is reflected by the component 4. In this case, the reflection signal produced in this way can be detected. It is thus possible, in the form of a light barrier, to determine the time at which the component 4 passes through the beam path of the respective light beam 10, 12. In FIG. 1, this is shown as that moment at which the component 4 passes through the first light beam, namely the light beam 12, seen in its movement direction. This time is indicated by $t_0$ in FIG. 1.

As the component 4 moves further, its leading edge at a later time $t_1$ passes through the beam path of the light beam 10. The component 4 has thus travelled through the distance y between the times $t_1$ and $t_0$. A characteristic value for the distance s can now be determined from the fact that the distance y travelled by the component 4 is given by:

$$y = v \cdot (t_1 - t_0)$$

where v is the speed at which the component 4 is moving. If the inclination angle $\alpha$ of the light beam 12 with respect to the light beam 10 is known, the distance x of the front face of the component 4 from the focal plane 13 is thus (assuming that the light beam 10 strikes the component 4 at right angles as in the present case) given by:

$$x = \frac{v \cdot (t_1 - t_0)}{\tan \alpha}$$

If the geometry is known, a characteristic value for the distance s can thus be determined from the time difference $t_1 - t_0$, using the relationship:

$$s = x_0 - \frac{v \cdot (t_1 - t_0)}{\tan \alpha}$$

However, a general triangulation principle such as this has the disadvantage that the evaluation is directly dependent on the speed v at which the component 4 is moving. Particularly in this case, in which fluctuations can occur in this parameter, a concept such as this therefore provides only limited accuracy. The measurement system 1 is now designed to compensate for such inaccuracies thus, in particular, also allowing it to be used for measurement of the radial gaps in a turbine, with particularly high accuracy. For this purpose, the triangulation element in the measurement system 1 is supplemented by a reference measurement, which allows the distance s to be determined independently of the actual speed v at which the component 4 is moving.

A further light beam 14 is provided for this purpose, and is aligned essentially parallel to the first-mentioned light beam 10. This light beam 14 in the exemplary embodiment shown in FIG. 1 is arranged at a position behind the light beams 10, 12, seen in the movement direction of the component 4. Any other desired physical arrangement is, however, also possible, of course, in this case. The measurement system 1 thus, on the one hand, has a convergent beam path formed by the light beams 10, 12 and, on the other hand, has a coaxial beam path formed by one of the light beams 10, 12 and the light beam 14.

In the exemplary embodiment shown in FIG. 1, the leading edge of the component 4 thus passes through the light beam 14 at the time $t_2$, so that a reflection signal which is associated with the light beam 14 can be detected at this time. Since the light beams 10, 14 are parallel, the (measurable) time difference $t_2 - t_1$ between the reflection signals associated with the light beam 10 and the light beam 14 is given by:

$$t_2 - t_1 = \frac{d}{v}$$

where d is the distance between the light beams 14, 10 seen in the direction in which the component 4 is moving. The distance s can thus be determined from the time difference $t_2-t_1$ using:

$$s = x_0 - \frac{d}{\tan\alpha} \cdot \frac{t_1 - t_0}{t_2 - t_1}$$

and thus without any need to consider an estimated value of the speed v at which the component 4 is moving.

In order to produce the light beams 10, 12, 14, the measurement system 1 has a light source 16, which has a number of light generators 18. In this case, each light generator 18 is associated with a respective one of the light beams 10, 12, 14. Furthermore, the measurement system 1 has a detector unit 20, which is connected to an evaluation unit 22. The detector unit 20 in this case determines the time at which a reflection signal caused by the component 4 arrives. The reflection signal is in this case produced by reflections of one of the light beams 10, 12, 14 on the surface of the component 12, so that the time at which a reflection signal is detected corresponds to the time at which the component 4 arrives in the respectively associated light beam 10, 12, 14.

In order to associate individual reflection signals with individual ones of the light beams 10, 12, 14, the light generators 18 are each designed to produce light at a different wavelength, with the detector 20 being designed to evaluate the received signals on a wavelength-selective basis. It is thus possible to associate the individual reflection signals with the individual light beams 10, 12, 14 in the detector 20, so that it is always possible to determine that time at which the component 4 enters the respective light beam 10, 12 or 14. The light-beam-specific time characteristic values obtained in this way are passed to the evaluation unit 22, in which a characteristic value for the distance s is determined on the basis of the known geometric values.

In order to allow the measurement system 1 to be used even in comparatively inaccessible locations and in a severe environment, for example for measurement of the radial gaps in a turbine, the active components such as the light source 16 and the detector 20 are physically decoupled from the reference surface 2. For this purpose, the light source 16 and the detector 20 are connected via an optical waveguide system 24 to a light outlet and inlet 26 which is arranged in the reference surface 2. The optical waveguide system 24 is in this case configured in the area of the light outlet and inlet 26 such that, firstly, it is possible for the light beams 10, 14 to emerge essentially parallel to one another and, secondly, it is possible for the light beam 12 to emerge essentially at an angle to the light beams 10, 14. For this purpose, the optical waveguide system 24 is provided in places with a lens arrangement 28 in the area of the light outlet and inlet 26, with this lens arrangement 28 allowing the light beams 10, 14 to pass through essentially in straight lines, while bending only the light beam 12.

The exemplary embodiment in FIG. 1 thus shows the combination of a triangulation measurement concept with a reference measurement using a total of three light beams 10, 12, 14, with the light beam 10 in this exemplary embodiment being used both for the triangulation measurement and for the reference measurement. In an alternative exemplary embodiment shown in FIG. 2, although a combination of a triangulation measurement with a reference measurement is provided in the measurement system 1' once again, completely different light beams are, however, provided for these two measurements. Four light beams are thus provided in the exemplary embodiment shown in FIG. 2, with two light beams 40, 42 which are aligned essentially parallel to one another being provided for carrying out the reference measurement, and two light beams 44, 46 which are at an angle to the light beams 40, 42 seen in the movement direction of the component 4 being provided for carrying out the triangulation measurement. The measurement system 1' thus on the one hand has a bi-convergent beam path formed by the light beams 44, 46, and on the other hand has a coaxial beam path formed by the light beams 40, 42.

Figure 2:
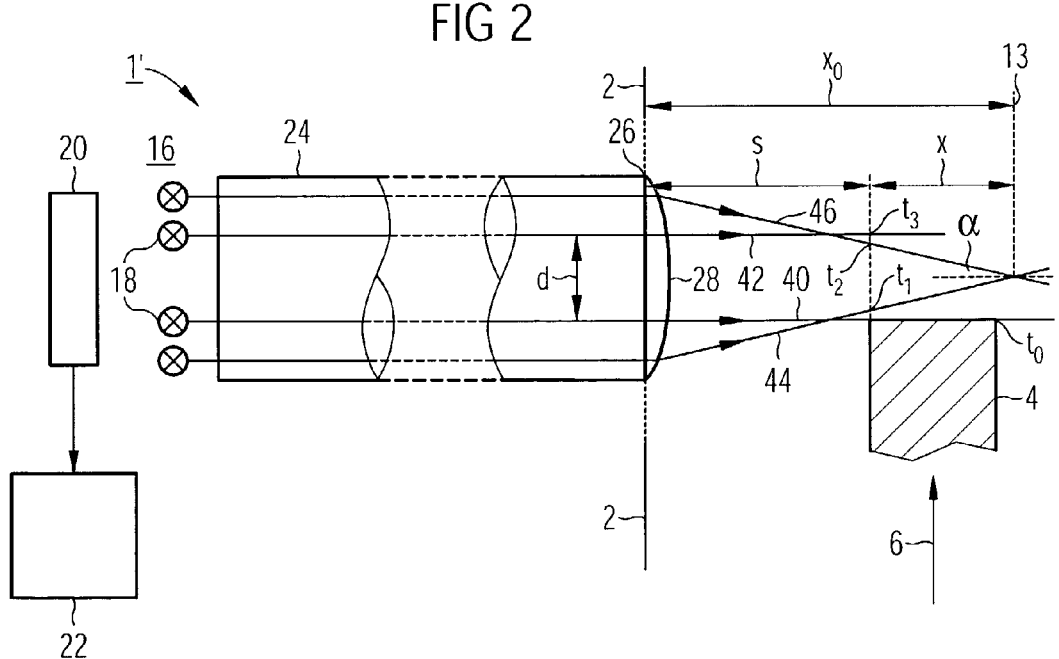
FIG. 2 shows an alternative embodiment of the measurement system shown in FIG. 1.

As indicated in FIG. 2, the leading edge of the component 4 passes through the beam path of the light beam 40 at the time $t_0$, passes through the beam path of the light beam 44 at the time $t_1$, passes through the beam path of the light beam 46 at the time $t_2$, and passes through the beam path of the light beam 42 at the time $t_3$. The actual sequence of these times as well as the physical positioning of the light beams 40, 42, 44, 46 may, of course, also be varied relative to one another in this case.

In the configuration of the measurement system 1' illustrated in FIG. 2, the characteristic value for the distance s can thus be determined from the relationship:

$$s = x_0 - \frac{d}{2 \cdot \tan\alpha} \cdot \frac{t_2 - t_1}{t_3 - t_0}$$

In the exemplary embodiment shown in FIG. 2, the lens arrangement 28 is, of course, designed such that it is possible for the light beams 40, 42 to pass essentially in a straight line through the reference surface 2, with the light beams 44, 46 being bent appropriately.

Figure 3:
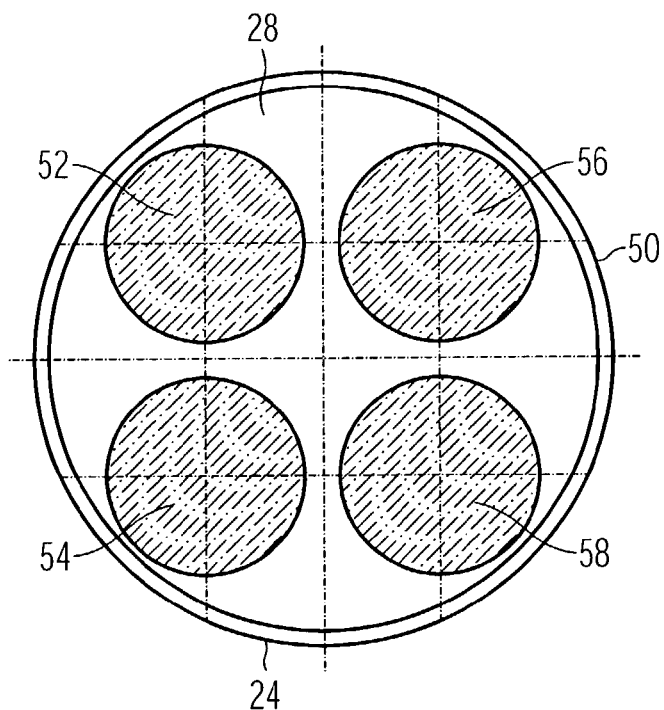
FIG. 3 shows a plan view of a measurement head of the measurement system shown in FIG. 1 or 2.

FIG. 3 shows a plan view of an example of the outlet area of the optical waveguide system 24 in the reference surface 2. In this exemplary embodiment, a number of beam systems 52, 54, 56, 58 with optical fibers, corresponding to the number of light beams, are arranged within a common casing 50. The beam systems 52, 54 are in this case provided for passing on the light beams which are intended for the triangulation measurement. Their outlet area is accordingly covered by the lens arrangement 28, which is in the form of a convex lens in this area. In contrast to this, the beam systems 56, 58 are designed to pass on the light beams provided for the reference measurement, and their outlet area is designed for the respective light beams to emerge essentially in a straight line.

Figure 4:
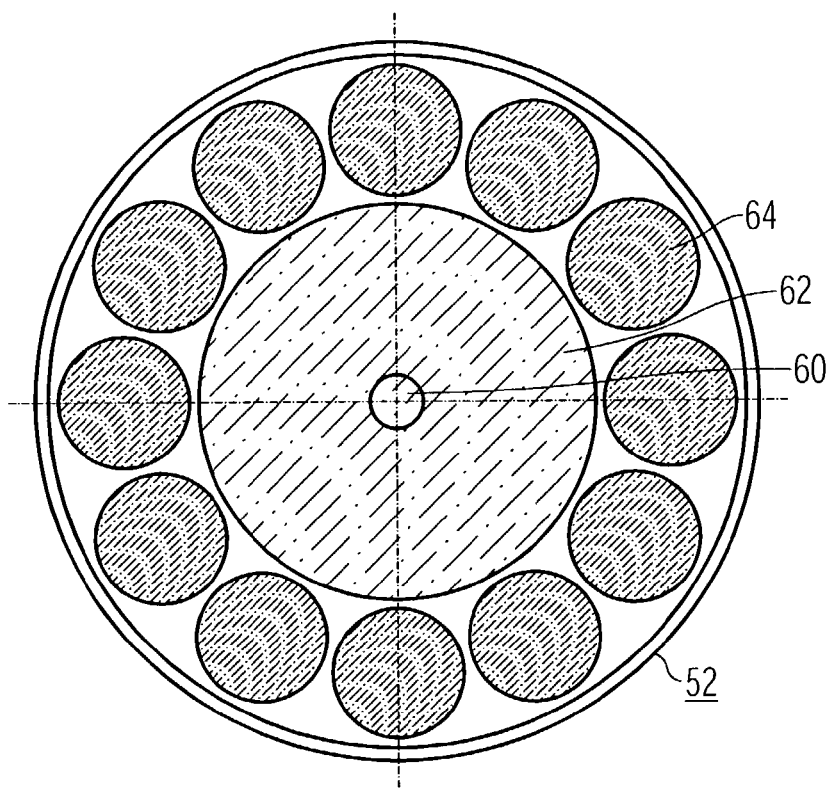
FIG. 4 shows a plan view of a beam system with optical fibers for the measurement head shown in FIG. 3.

FIG. 4 shows the configuration of a single beam system 52. In this case, an active fiber 60 is arranged in the central area of the beam system 52, and is surrounded by a fiber collimator 62. In the outer area, on the other hand, a number of passive fibers 64 are arranged, with or without a respectively associated collimator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for measurement of a distance between a component which is moved past a reference surface and the reference surface, comprising:
monitoring two light beams in the movement direction of the component, aligned essentially parallel to one another, and at least one further light beam, aligned at an angle to the parallel light beams, for a respectively associated reflection signal which is caused by the component,
determining a characteristic value for the distance using a time difference between an arrival of the reflection signals associated with the parallel light beams and the time difference between the arrival of the reflection signals associated with one of the parallel light beams and at least one angled light beam.

2. The method as claimed in claim 1, wherein the characteristic value for the distance is determined from a ratio of the time differences.

3. The method as claimed in claim 2, wherein a light at a different wavelength is used for each of the light beams.

4. The method as claimed in claim 1, wherein a light at a different wavelength is used for each of the light beams.

5. A system for measurement of a distance between a component which is moved past a reference surface and the reference surface, comprising:
a light source, adapted to produce at least two light beams aligned essentially parallel to one another, and at least one further light beam aligned at an angle to the parallel light beams in the movement direction of the component; and
a detector, adapted to detect reflection signals associated with each of the light beams and caused by the component, wherein the detector includes,
an associated evaluation unit, adapted to determine a distance characteristic value from a time difference between an arrival of the reflection signals associated with the parallel light beams, and from a time difference between an arrival of the reflection signals associated with one of the parallel light beams and at least one angled light beam.

6. The system as claimed in claim 5, wherein the evaluation unit is adapted to determine the distance characteristic value from a ratio of the time differences.

7. The system as claimed in claim 6, wherein the light source includes a plurality of light generators corresponding to the number of light beams, wherein the light generators differ from one another in a wavelength of light produced.

8. The system as claimed in claim 5, wherein the light source includes a plurality of light generators corresponding to the number of light beams, wherein the light generators differ from one another in a wavelength of light produced.

9. The system as claimed in claim 5, wherein the light source is connected via an optical waveguide system to a light outlet and inlet, arranged in the reference surface.

10. The system as claimed in claim 9, wherein the detector is connected via the optical waveguide system to the light outlet and inlet.

11. The system as claimed in claim 10, wherein the optical waveguide system is provided with a lens arrangement in the area of the light outlet and inlet.

12. The system as claimed in claim 10, wherein the optical waveguide system is provided with a convex lens, in the area of the light outlet and inlet.

13. The system as claimed in claim 10, wherein the optical waveguide system includes a plurality of beam systems arranged within a common casing, corresponding to the number of light beams.

14. The system as claimed in claim 9, wherein the optical waveguide system is provided with a lens arrangement in the area of the light outlet and inlet.

15. The system as claimed in claim 14, wherein the optical waveguide system includes a plurality of beam systems arranged within a common casing, corresponding to the number of light beams.

16. The system as claimed in claim 9, wherein the optical waveguide system includes a plurality of beam systems arranged within a common casing, corresponding to the number of light beams.

17. The system as claimed in claim 9, wherein the optical waveguide system is provided with a convex lens in the area of the light outlet and inlet.

18. The system as claimed in claim 5 for monitoring the radial gap in a turbine.

19. An apparatus for monitoring the radial gap in a turbine, comprising the system of claim 5.

20. A system for measurement of a distance between a component which is moved past a reference surface and the reference surface, comprising:
light source means for producing at least two light beams aligned essentially parallel to one another, and at least one further light beam aligned at an angle to the parallel light beams in the movement direction of the component; and
detection means for detecting reflection signals associated with each of the light beams and caused by the component, wherein the detection means includes,
an associated evaluation means for determining a distance characteristic value from a time difference between an arrival of the reflection signals associated with the parallel light beams, and from a time difference between an arrival of the reflection signals associated with one of the parallel light beams and at least one angled light beam.

21. The system as claimed in claim 20, wherein the evaluation means is for determining the distance characteristic value from a ratio of the time differences.

22. The system as claimed in claim 20, wherein the light source means includes a plurality of light generating means corresponding to the number of light beams, wherein the light generating means differ from one another in a wavelength of light produced.

23. The system as claimed in claim 20, wherein the light source means is connected via an optical waveguide system to a light outlet and inlet, arranged in the reference surface.

24. The system as claimed in claim 23, wherein the detection means is connected via the optical waveguide system to the light outlet and inlet.

25. The system as claimed in claim 23, wherein the optical waveguide system is provided with a lens arrangement in the area of the light outlet and inlet.

26. The system as claimed in claim 23, wherein the optical waveguide system includes a plurality of beam systems arranged within a common casing, corresponding to the number of light beams.

27. The system as claimed in claim 20 for monitoring the radial gap in a turbine.

28. An apparatus for monitoring the radial gap in a turbine, comprising the system of claim 20.

* * * * *